US012638364B2

(12) United States Patent
Craig et al.

(10) Patent No.: US 12,638,364 B2
(45) Date of Patent: May 26, 2026

(54) METHODS AND DEVICES FOR COLLECTING INTER-LIFT LEACH SOLUTIONS

(71) Applicant: FREEPORT MINERALS CORPORATION, Phoenix, AZ (US)

(72) Inventors: Paddy Craig, Pima, AZ (US); Jarid W. Gardner, Pima, AZ (US); Paola G. Barraza, Morenci, AZ (US); William Duane Sanders, Morenci, AZ (US); Etienne Gagne-Marchildon, Tucson, AZ (US)

(73) Assignee: FREEPORT MINERALS CORPORATION, Phoenix, AZ (US)

( * ) Notice: Subject to any disclaimer, the term of this patent is extended or adjusted under 35 U.S.C. 154(b) by 326 days.

(21) Appl. No.: 18/318,564

(22) Filed: May 16, 2023

(65) Prior Publication Data

US 2024/0385085 A1     Nov. 21, 2024

(51) Int. Cl.
*G01N 1/14* (2006.01)
*C22B 3/00* (2006.01)
*G01N 1/10* (2006.01)

(52) U.S. Cl.
CPC ................. *G01N 1/14* (2013.01); *C22B 3/00* (2013.01); *G01N 2001/1025* (2013.01); *G01N 2001/1463* (2013.01)

(58) Field of Classification Search
CPC ............. G01N 1/14; G01N 2001/1025; G01N 2001/1463; G01N 2001/205; G01N 2001/4088; G01N 1/2035; G01N 2001/1032; G01N 2001/1043; C22B 3/00

USPC ........ 73/61.42, 64, 56, 863, 863.21, 863.81, 73/863.86, 864.51, 864.63, 864.73, 73/864.81; 299/3, 5
See application file for complete search history.

(56) References Cited

U.S. PATENT DOCUMENTS

| | | | |
|---|---|---|---|
| 4,526,615 A | 7/1985 | Johnson | |
| 4,958,528 A * | 9/1990 | Garrison | G01N 1/10 |
| | | | 73/864.63 |
| 8,986,423 B2 | 3/2015 | Lang et al. | |
| 2022/0299496 A1 | 9/2022 | Martinez | |

FOREIGN PATENT DOCUMENTS

| | | | | |
|---|---|---|---|---|
| CA | 2221703 C * | 5/2007 | .......... | B01D 61/145 |
| CN | 101261201 B | 8/2010 | | |
| CN | 207051285 U | 2/2018 | | |
| CN | 207366042 U | 5/2018 | | |
| CN | 110208038 A | 9/2019 | | |
| DE | 9320560 U1 | 11/1994 | | |
| DE | 102017004167 B4 | 10/2018 | | |

* cited by examiner

*Primary Examiner* — Robert R Raevis
(74) *Attorney, Agent, or Firm* — SNELL & WILMER L.L.P.

(57) ABSTRACT

A device and method for recovering a metal-bearing solution from a leaching system is provided. The method includes collecting, using the collector of a solution sampling device, a metal-bearing solution from a leaching system, storing, using the storage reservoir of the solution sampling device, the metal-bearing solution, pressurizing, using an air pressure line of the solution sampling device, the storage reservoir, and discharging, using a solution sampling line of the solution sampling device, the metal-bearing solution from the storage reservoir.

7 Claims, 3 Drawing Sheets

METHODS AND DEVICES FOR COLLECTING INTER-LIFT LEACH SOLUTIONS

FIELD OF INVENTION

The present invention generally relates to methods and devices for collecting inter-lift solutions, more specifically, to methods and devices for the collection of solutions from run-of-mine (or "ROM") leaching heaps.

BACKGROUND

Heap leaching provides a low-cost method for extracting metal values from relatively low-grade metal-bearing materials and has found particular application in the processing of metal-bearing ores. Before an ore deposit is mined, the ore is said to be in an in-situ state. During mining, the metal-bearing material may progress through multiple stages as it is extracted, transported, and processed. For example, the metal-bearing material as extracted at the mining site may often be referred to as run-of-mine (or "ROM") ore. ROM ore may be produced by, for example, blasting, open pit mining, and other surface and subterranean ore extraction techniques. As such, ROM ore includes ore of various sizes from ore as small as powder up to and including boulders. After mining, the ROM ore is transported to a heap location where it is stacked onto an impervious pad without any intermediary extraction enhancement treatments, such as crushing or agglomeration. This lack of energy intensive pre-treatment renders ROM heap leaching a low-cost processing method relative to other mineral processing methods such as crushed ore heap leaching or froth flotation and smelting and is a useful option for ores containing an otherwise noneconomic concentration of extractable metal value.

After placement, a suitable acidic solution is then dispensed onto the heap, the acid dissolves the metal ions from readily soluble minerals to form a metal-bearing solution. This resulting metal-bearing solution trickles slowly through the heap under the force of gravity until it reaches the collection pad at the base of the heap. This pad typically has a sloped base to allow the solution to flow into collection drains, which discharge into a leach pond or tank, for further processing, such as by conventional, solvent extraction/electrowinning (SX/EW) or direct electrowinning (DEW).

For effective metal extraction, the ore must be leached for a sufficient amount of time, generally up to several months. After the ore has been leached for a sufficient number of days (days under leach or the leach cycle), the leach solution flow to the leach pad may be shut off and the pad may be allowed to partially dry out. The copper recovered after this first leach cycle of a heap-lift is called first cycle recovery and represents most (about 80%) of the copper that may be recovered from the ore present in that lift. The optimization of leach heaps requires constant monitoring as many variables must be controlled to maximize metal recovery, including acid content, permeability, particle size distribution, temperature, and oxygen content and, as the slow kinetics of leaching reactions occur over months and years rather than hours and days, monitoring and prediction models are crucial for the success of the leaching process.

Unfortunately, the disintegration of the ore from acid weathering is extremely difficult to realistically include in a numerical leaching model of the process. Ores are blends of various minerals that vary considerably in their resistance to acid disintegration. For example, some ores contain acid consuming materials which can prevent applied acid from reaching the target mineral. These ores require higher additions of acid to extract the metal values and, by the time the solution is retrieved and analyzed from the bottom of the heap pad, valuable leaching time has been lost.

A need exists to sample and analyze first cycle recovery data from within the ROM heap pad to allow for more effective pad monitoring and performance control. Currently known sampling devices are often used in crushed ore heap pads and are not sturdy enough to support the larger ROM material.

SUMMARY

In one aspect of the present invention, a device for sampling a metal-bearing solution is provided. The device includes a collector, a grating removably coupled to the collector, a storage reservoir removably coupled to the collector, a check valve disposed between the storage reservoir and the collector, an air pressure line configured to pass through the collector and rest in the reservoir, and a solution sampling line configured to pass through the collector and rest in the reservoir.

In various embodiments, the device may further include a plurality of support braces coupled to the storage reservoir.

In various embodiments, the air pressure line may be configured to point at the check valve.

In various embodiments, the collector may be comprised of a top half and a bottom half, wherein the top half of the collector has vertical walls, and the bottom half of the collector has sloped walls.

In various embodiments, the check valve further comprises an open position and a closed position.

In various embodiments, the grating comprises a first layer and a second layer, and wherein the first layer is configured to prevent any large solid material from entering the storage reservoir, and wherein the second layer is configured to prevent any fine solid material from entering the storage reservoir.

In various embodiments, the air pressure line and the solution sampling line comprise non-corrosive tubing.

In various embodiments, the collector, grating, and storage reservoir comprise non-corrosive material.

In another aspect of the present invention, a method for sampling a metal-bearing solution is provided. The method includes collecting, using the collector of a solution sampling device, a metal-bearing solution from a leaching system, storing, using the storage reservoir of the solution sampling device, the metal-bearing solution, pressurizing, using an air pressure line of the solution sampling device, the storage reservoir, and discharging, using a solution sampling line of the solution sampling device, the metal-bearing solution from the storage reservoir. In various embodiments, the method may further comprise flushing the storage reservoir of any trapped solids.

In various embodiments, the leaching system is a run-of-mine heap leaching system. In various embodiments, the run-of-mine heap leaching system is comprised of a plurality of lifts, wherein at least one of the lifts in the plurality of lifts is stacked on top of at least one other lift in the plurality of lifts. In various embodiments, the solution sampling device is disposed beneath at least one of the lifts in the plurality of lifts. In various embodiments, a plurality of solution sampling devices may be placed in different locations throughout the plurality of lifts in the heap leaching system.

In various embodiments, the pressuring comprises providing an air pressure to the air pressure line, wherein the air pressure line is configured to pressurize the storage reservoir and close a check valve of the solution sampling device upon receiving an air pressure.

In various embodiments, the metal-bearing solution comprises acid and at least one metal value. In various embodiments, the at least one metal value comprises copper, nickel, zinc, silver, gold, germanium, lead, arsenic, antimony, chromium, molybdenum, rhenium, tungsten, iron, ruthenium, osmium, cobalt, rhodium, iridium, palladium, platinum, uranium, or rare earth metals.

In another aspect of the present invention, a system for sampling a metal-bearing solution is provided. The system includes a leaching system and a plurality of solution sampling devices, wherein each solution sampling device comprises: a collector, a grating removably coupled to the collector, a storage reservoir coupled to the collector, a check valve disposed between the storage reservoir and the collector, an air pressure line configured to pass through the collector and rest in the reservoir, and a solution sampling line configured to pass through the collector and rest in the reservoir, wherein the plurality of solution sampling devices are configured to discharge a metal-bearing solution in response to a pressurization of the device.

BRIEF DESCRIPTION OF THE DRAWINGS

The subject matter of the present invention is particularly pointed out and distinctly claimed in the concluding portion of the specification. A more complete understanding of the present invention, however, may best be obtained by referring to the detailed description and claims when considered in connection with the drawing figures, wherein like numerals denote like elements and wherein:

DETAILED DESCRIPTION OF EXEMPLARY EMBODIMENTS

Figure 1:
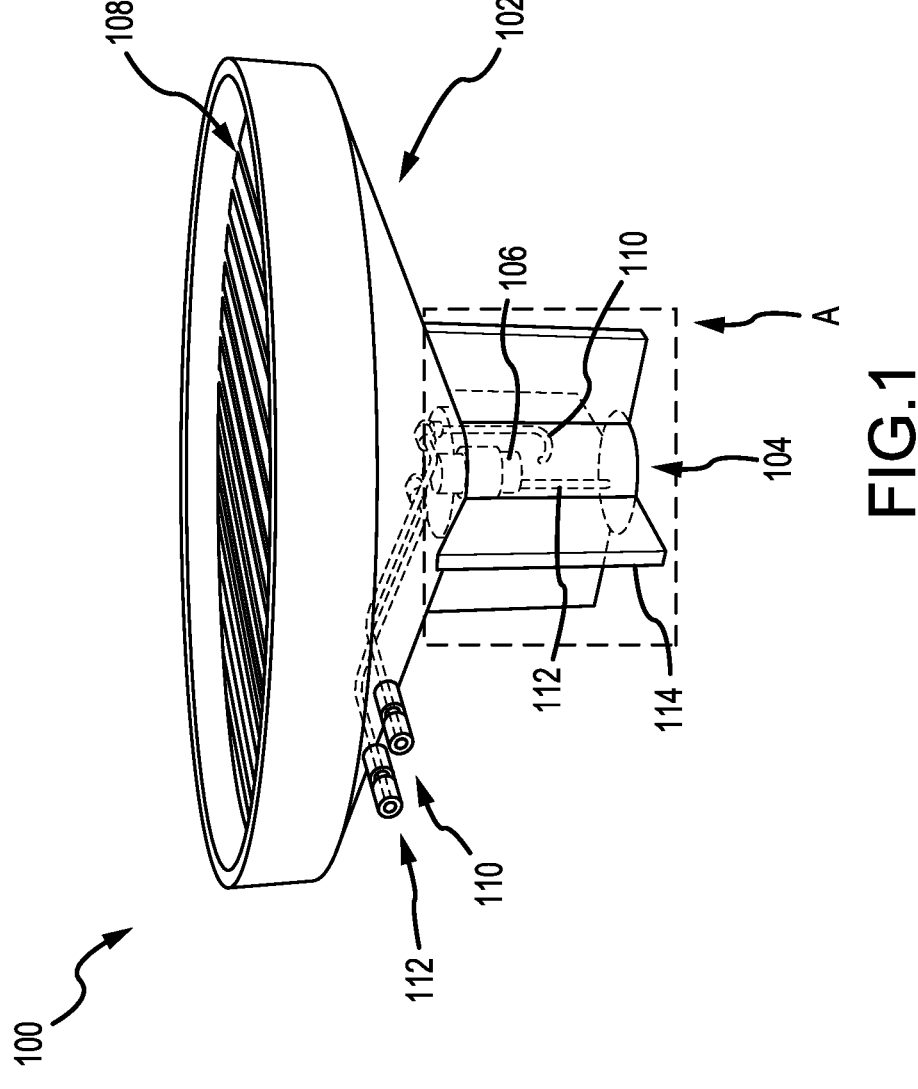
FIG. 1 a front view of a device according to this disclosure.
Figure 2:
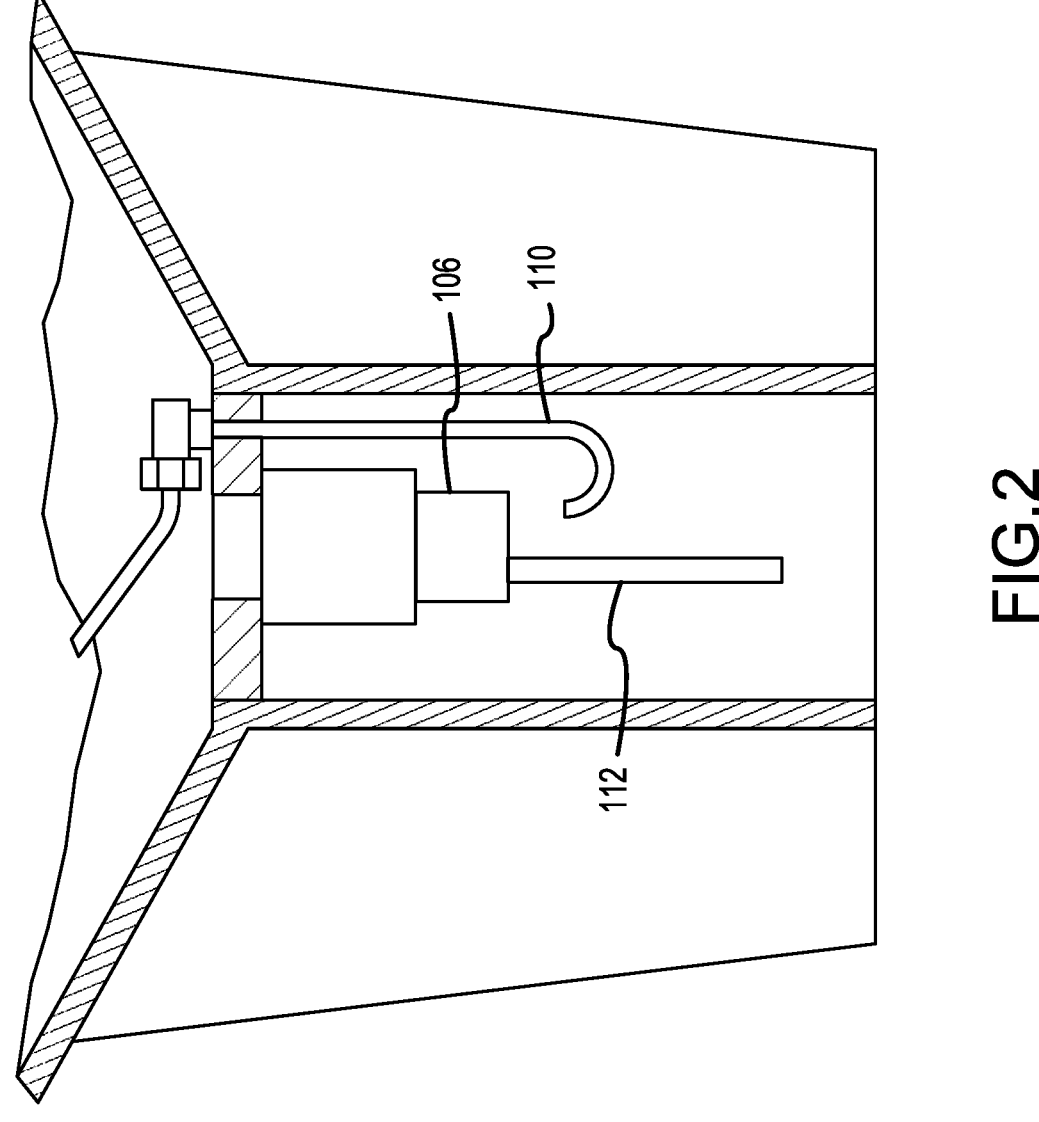
FIG. 2 is a magnified view of section A from FIG. 1.

The following description is merely exemplary in nature and is not intended to limit the present invention, its applications, or its uses. It should be understood that throughout the drawings, corresponding reference numerals indicate like or corresponding parts and features. The description of specific examples indicated in various embodiments of the present invention are intended for purposes of illustration only and are not intended to limit the scope of the invention disclosed herein. Moreover, recitation of multiple embodiments having stated features is not intended to exclude other embodiments having additional features or other embodiments incorporating different combinations of the stated features.

Furthermore, the detailed description of various embodiments herein makes reference to the accompanying drawing figures, which show various embodiments by way of illustration. While the embodiments are described in sufficient detail to enable those skilled in the art to practice the invention, it should be understood that other embodiments may be realized, and that logical and mechanical changes may be made without departing from the spirit and scope of the present invention. Thus, the detailed description herein is presented for purposes of illustration only and not of limitation. For example, steps or functions recited in descriptions of any method, system, or process may be executed in any order and are not limited to the order presented. Moreover, any of the step or functions thereof may be outsourced to or performed by one or more third parties. Furthermore, any reference to singular includes plural embodiments, and any reference to more than one component may include a singular embodiment.

The present invention generally relates to methods and devices for collecting inter-lift solutions, more specifically, to methods and devices for the collection of solutions from run-of-mine (or "ROM") leaching heaps. Various embodiments of the present invention provide a method for sampling a metal-bearing solution. The method includes collecting, using the collector of a solution sampling device, a metal-bearing solution from a leaching system, storing, using the storage reservoir of the solution sampling device, the metal-bearing solution, pressurizing, using an air pressure line of the solution sampling device, the storage reservoir, and discharging, using a solution sampling line of the solution sampling device, the metal-bearing solution from the storage reservoir. In accordance with various embodiments of the present invention, the disclosed process promotes improved operational efficiency and ultimately results in increased metal recovery.

In accordance with an exemplary embodiment of the present invention, a method for sampling a metal-bearing solution includes the steps of: (i) collecting, using the collector of a solution sampling device, a metal-bearing solution from a leaching system; (ii) storing, using the storage reservoir of the solution sampling device, the metal-bearing solution; (iii) pressurizing, using an air pressure line of the solution sampling device, the storage reservoir; and (iv) discharging, using a solution sampling line of the solution sampling device, the metal-bearing solution from the storage reservoir. In various embodiments, the method may further include a flushing step, wherein the reservoir is rinsed to remove any trapped solids.

In various embodiments, the leaching system is a run-of-mine heap leaching system comprised of a plurality of lifts, and wherein at least one of the lifts in the plurality of lifts is stacked on top of at least one other lift in the plurality of lifts. In various embodiments, the solution sampling device is disposed beneath at one of the lifts in the plurality of lifts.

In various embodiments, the pressurizing comprises providing an air pressure to the air pressure line, wherein the air pressure line is configured to pressurize the storage reservoir and close a check valve of the solution sampling device upon receiving an air pressure.

Referring now to FIG. 1, a device 100 is illustrated according to various embodiments of the present invention. Device 100 comprises a collector 102 and a reservoir 104 coupled to collector 102. In various embodiments, collector 102 may comprise any configuration and dimensions suitable for capturing free-flowing solution within a leach heap. In various embodiments, collector 102 may comprise a box shape or a funnel shape. In various embodiments, collector 102 may comprise a 24" diameter opening. Check valve 106 is disposed within reservoir 104 and forms an interface between collector 102 and reservoir 104, wherein check valve 106 has an open and a closed position. In various embodiments, check valve 106 may be a diaphragm check valve, a modified spring-loaded check valve with the spring removed, or any device suitable for allowing solutions to flow through the valve.

Grating 108 is removably coupled to collector 102. In various embodiments, grating 108 may be comprised of any material suitable for preventing large solid materials from entering collector 102 while allowing solutions to enter collector 102, such as, for example, fiberglass or non-corrosive materials. In various embodiments, grating 108 may further comprise a mesh screen configured to prevent fine solid materials from entering collector 102.

Air pressure line 110 is disposed within reservoir 104 and configured to pass through collector 102, wherein the distal end of air pressure line 110 rests outside of device 100. In various embodiments, distal end of air pressure line 110 is configured to removably couple with a pressurizing device. In various embodiments, such as where device 100 is placed at a distance from the perimeter of the leach heap, the distal end of air pressure line 110 may removably couple with a pressurizing device through an intermediary extension line. In various embodiments, proximal end of air pressure line 110 is configured to point at check valve 106. Solution sampling line 112 is disposed within reservoir 104 and configured to pass through collector 102, wherein the distal end of solution sampling line 112 rests outside of device 100.

When air pressure is applied to the distal end of air pressure line 110, air pressure line 110 pressurizes reservoir 104, closing check valve 106. After reservoir 104 is fully pressurized, solution flows through solution sampling line 112 and is discharged outside of device 100. The solution can then be collected for sampling. Air pressure line 110 and solution sampling line 112 may be comprised of any material suitable for transporting air and solutions respectively, such as, for example, polyethylene line.

In various embodiments, a plurality of support braces 114 are coupled to device 100. In various embodiments, collector 102, reservoir 104, and support braces 114 may be comprised of any material suitable to withstand the compressive force from a ROM leach heap, such as, for example, high-density polyethylene (HDPE). In various embodiments, the leach heap is a run-of-mine leach heap comprised of a plurality of lifts, wherein at least one lift in the plurality of lifts is disposed on top of at least one other lift in the plurality of lifts.

Device 100 allows leaching systems to be sampled while leaching operations are in progress, before the solution is sent to downstream processing systems, such as, for example, Solvent Extraction/Electrowinning (SXEW) and/or Direct Electrowinning (DEW). By taking samples from inside the heap, parameters such as metal grade, acid concentration, reagent concentration, pH, microbial concentration, and ferrous to ferric ion ratios can be measured and analyzed. If analysis finds that a parameter is off and should be adjusted, this adjustment can be put into effect immediately, allowing for production to be optimized and metal recovery to be increased. The ability to sample the leach solutions inter lift before the solution is sent to downstream processing is also advantageous for predicting potential negative downstream impacts.

For example, a heap leaching system's operational efficiency is related to many different factors, such as acid strength in the leach solution, amount of leach solution dispersed on the heap, application rate (flowrate) of the leach solution, days in a leach cycle, temperature and pH of the heap, and the physical and mineralogical characteristics of the adjacent ore particles. Conditions across the heap are not uniform and certain areas of the heap may leach differently than others due to either too much or too little acid, permeability issues, particle size distribution, or the kinetics of chemical reactions. In such a leaching system, samples taken from within the heap with device 100 will enable operators to analyze leach conditions within weeks and target specific areas with certain reagents, more acid, or an increased temperature or oxygen content. Without the first cycle recovery data captured by device 100, the metal-bearing solution could not be analyzed until after it percolated to the bottom of the heap, 200-300 days later. At this point, should operational issues be discovered, adjustments would be too late to maximize recovery of metal values (i.e. the extractable metal in a metal-bearing material).

Device 100 has improved benefits over known sampling systems as its wide collector 102 diameter enables solution to be collected under a bigger surface area of coarse ore-containing ROM leach heaps while its positive pressurization system allows for larger amounts of solution to be discharged from device 100. Further, device 100's sturdy configuration allows it to support the compressive weight of ROM heap leach lifts and operating equipment. Additionally, device 100 is a self-contained system, rendering installation simple and quick.

In various embodiments, device 100 may further comprise a flushing system (not shown) to remove any solid material from within device 100 that may be causing plugging issues or limited flow. In such embodiments, pressurized water would be applied to air pressure line 110 until reservoir 104 is fully pressurized with water. In response to reservoir 104 fully pressurizing, the rinse water is discharged through solution sampling line 112. In various embodiments, device 100 may further comprise a plurality of sensors (not shown) to continuously monitor certain characteristics of the heap. The plurality of sensors may comprise pH, ORP, temperature, conductivity, and dissolved oxygen sensors.

Figure 3:
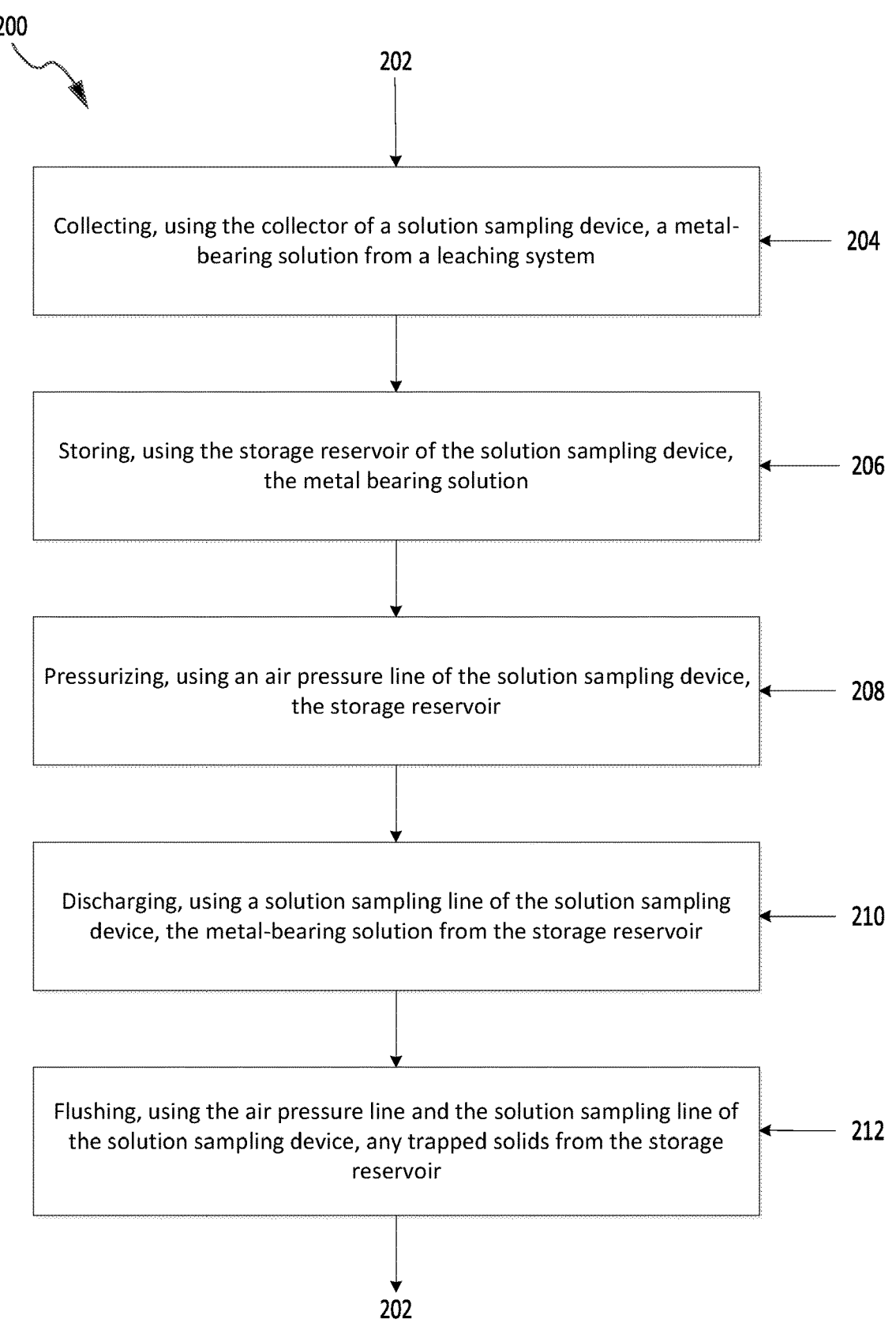
FIG. 3 is a flow diagram illustrating a sampling method in accordance with various embodiments of the present invention.

Turning now to FIG. 3, a method 200 is illustrated according to various embodiments of the present invention. In various embodiments, metal-bearing solution 202 percolates down through the heap of a leaching system, extracting metal values out of ore (not shown) and into metal-bearing solution 202. Examples of metal values include, but are not limited to, copper, nickel, zinc, silver, gold, germanium, lead, arsenic, antimony, chromium, molybdenum, rhenium, tungsten, iron, ruthenium, osmium, cobalt, rhodium, iridium, palladium, platinum, uranium, or rare earth metals. More preferably, the metal values can be copper, nickel, and/or zinc. Most preferably, the metal value is copper. In various embodiments, metal-bearing solution 202 may further comprise leaching solutions, such as, for example, acid, and/or leaching additives, such as, for example, microbes and oxygen. In various embodiments, metal-bearing solution 202 comprises intermediate leach solution ("ILS").

In various embodiments, as metal-bearing solution 202 percolates down through the heap, a portion is sampled by the solution sampling device of method 200. In various embodiments, method 200 may use a solution sampling device such as shown in FIG. 1. Metal-bearing solution 202 is subjected to the collecting 204 and storing 206 stages of method 200 and is stored until a sample is required. When a sample is required, the solution sampling device is subjected to a pressurizing process 208 and metal-bearing solution 202 is subjected to a discharging process 210 from the solution sampling device and can be sampled. In various embodiments, pressurizing process 208 may comprise applying air to an air pressure line until the solution sampling device is fully pressurized. In various embodiments, discharging process 210 may comprise discharging the entirety of metal-bearing solution 202 from the solution sampling device. This ability to completely empty the solution sampling device allows the samples to provide an accurate representation of the internal characteristics of the heap at time of sampling, as older solutions will not be left in the device to contaminate the sample. Further, other sampling devices that are incapable of full discharge slowly filled up over time with leftover solutions, and, once full, were no longer operational. The disclosed invention thus provides a more accurate, consistent, and sustainable method of sampling. Samples may be taken using method 200 as often as necessary to ensure efficient operation of a leach heap, such as, for example, daily.

In various embodiments, method 200 may further comprise a flushing process 212 to flush out the solution sampling device between sample collections and remove any contaminating material. In such embodiments, the flushing process may comprise applying a rinsing solution to an air pressure line of the solution sampling device until the solution sampling device is fully pressurized with the rinsing solution and then discharging the rinsing solution from the solution sampling device using a solution sampling line of the solution sampling device. In various embodiments, the rinsing solution may comprise water. In various embodiments, the contaminating material may include trapped solid residue and/or metal-bearing solution.

The present invention has been described with reference to various exemplary embodiments. However, many changes, combinations, and modifications may be made to the exemplary embodiments without departing from the scope of the present invention. For example, the various components may be implemented in alternate ways. These alternatives can be suitably selected depending upon the particular application or in consideration of any number of factors associated with the operation of the system. In addition, the techniques described herein may be extended or modified for use with other metal extraction processes. These and other changes or modifications are intended to be included within the scope of the present claims.

The present invention has been described above with reference to a number of exemplary embodiments. It should be appreciated that the particular embodiments shown and described herein are illustrative of the invention and its best mode and are not intended to limit in any way the scope of the invention as set forth in the claims. Those skilled in the art having read this disclosure will recognize that changes and modifications may be made to the exemplary embodiments without departing from the scope of the present invention. For example, various aspects and embodiments of this invention may be applied to recovery of metals other than copper, such as nickel, zinc, cobalt, and others. Although certain preferred aspects of the invention are described herein in terms of exemplary embodiments, such aspects of the invention may be achieved through any number of suitable means now known or hereafter devised. Accordingly, these and other changes or modifications are intended to be included within the scope of the present invention.

It is believed that the disclosure set forth above encompasses at least one distinct invention with independent utility. While the invention has been disclosed in the exemplary forms, the specific embodiments thereof as disclosed and illustrated herein are not to be considered in a limiting sense as numerous variations are possible. Equivalent changes, modifications and variations of various embodiments, materials, compositions, and methods may be made within the scope of the present invention, with substantially similar results. The subject matter of the inventions includes all novel and non-obvious combinations and sub combinations of the various elements, features, functions, and/or properties disclosed herein.

Benefits, other advantages, and solutions to problems have been described herein with regard to specific embodiments. However, the benefits, advantages, solutions to problems, and any element or combination of elements that may cause any benefit, advantage, or solution to occur or become more pronounced are not to be construed as critical, required, or essential features or elements of any or all the claims or the invention. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

What is claimed is:

1. A method for sampling a metal-bearing solution comprising:
    collecting, using a collector of a solution sampling device, a metal-bearing solution from a leaching system;
    storing, using a storage reservoir of the solution sampling device, the metal-bearing solution;
    pressurizing, using an air pressure line of the solution sampling device, the storage reservoir; and
    discharging, using a solution sampling line of the solution sampling device, the metal-bearing solution from the storage reservoir.

2. The method of claim 1, wherein the leaching system is a run-of-mine heap leaching system.

3. The method of claim 2, wherein the run-of-mine heap leaching system is comprised of a plurality of lifts, and wherein at least one of the lifts in the plurality of lifts is disposed on top of at least one other lift in the plurality of lifts.

4. The method of claim 3, wherein the device is disposed beneath at least one of the lifts in the plurality of lifts.

5. The method of claim 1, wherein the pressurizing comprises providing an air pressure to a first end of the air pressure line, wherein the air pressure line is configured to pressurize the storage reservoir and close a check valve of the solution sampling device upon receiving the air pressure.

6. The method of claim 1, further comprising flushing the storage reservoir of a contaminating material, wherein the flushing comprises:
    providing a rinsing solution to a first end of the air pressure line, wherein the air pressure line is configured to pressurize the storage reservoir and close a check valve of the solution sampling device upon receiving the rinsing solution, and wherein in response to the pressurization, the storage reservoir fills with the rinsing solution; and
    discharging, using the solution sampling line of the solution sampling device, the rinsing solution and the contaminating material from the storage reservoir.

7. The method of claim 6, wherein the metal-bearing solution comprises at least one metal value comprising copper, nickel, zinc, silver, gold, germanium, lead, arsenic, antimony, chromium, molybdenum, rhenium, tungsten, iron, ruthenium, osmium, cobalt, rhodium, iridium, palladium, platinum, uranium, or rare earth metals.

* * * * *